Dec. 4, 1962  W. A. CZAPAR  3,066,368
STEERING WHEEL CLAMPING FOR VEHICLES
Filed Feb. 18, 1960

INVENTOR
William A. Czapar.

BY John C. Black
ATTORNEY.

United States Patent Office 3,066,368
Patented Dec. 4, 1962

3,066,368
STEERING WHEEL CLAMPING FOR VEHICLES
William A. Czapar, Chicago, Ill., assignor to Stewart-Warner Corporation, Chicago, Ill., a corporation of Virginia
Filed Feb. 18, 1960, Ser. No. 9,582
3 Claims. (Cl. 24—81)

This invention relates to an improved steering wheel clamping device. During the alignment and balancing of vehicle wheels, it is desirable to maintain the steering wheel in a rigidly clamped position. In the event that the steering wheel is not clamped during wheel balancing, the wheel being checked for unbalance will in most instances shift to a cocked position relative to the pickup head of the unbalance detection apparatus. This prevents accurate balancing.

When the front wheels of a vehicle are being aligned, the steering wheel clamp is utilized to perform two functions. One of these functions is to correctly position the steering wheel in a straight ahead location while the proper toe-in corrections are being made. That is, the steering wheel spokes and/or trim must be in an angular position giving an appearance to the operator of being in symmetrical alignment with a straight ahead direction when in fact the wheels are properly aligned for such straight ahead direction.

The other function is performed when toe-in corrections are being made at the front wheel tie rod linkage. The vehicle tie rod is the sole connecting member regulating the relative positions of the two front wheels. Adjustment of the tie rod end at one wheel will, in some instances, affect the position of the opposing wheel unless means is provided to prevent this mispositioning. Maintaining the steering wheel in a fixed position is one method for preventing such mispositioning of the opposing wheel.

So far as is known, commercial steering wheel clamping devices are generally adapted for connection between the steering wheel and the front seat of the vehicle. The primary disadvantage of this approach is the time consuming and sometimes difficult installation procedure required to properly position the steering wheel in a fixed position. In addition, such devices are relatively expensive and require cleaning and maintenance to prevent damage to the vehicle upholstery.

Accordingly, it is the primary object of the present invention to provide a simple, economical steering wheel clamp which is universally attachable to all known makes of domestic and foreign passenger vehicles as well as to many of the trucks.

Another important object is the provision of a steering wheel clamp which is adapted for ease of attachment to many rigid, fixed parts of a vehicle, such as the side window, vent window, door frame, vent window post etc., which parts have elongated attaching edges varying in distance from the steering wheel. The preferred embodiment is characterized by a tie bar of fixed length with spring clips attached at either end of the bar. The spring clips are mounted at an angle preferably in the order of 45° with respect to each other. The clips are further adapted for rotation about their mounting axes.

It is another object of the present invention to provide an improved means for mounting the spring clips on the ends of the bar.

One of the features of the present invention is the provision of a general C-shaped spring clip with the free ends of the clip formed inwardly toward the base in an irregular fashion. This provides better gripping action because of greater contact area between the clip and the member being gripped.

An additional feature is the provision of a rubberlike coating material such as vinyl plastic on the spring clips for better gripping action and for preventing marring of the steering wheel and opposing anchoring member.

An additional feature of the present invention is the improved mounting of each spring clip on the tie bar by means of a machine screw and elastic stop nut tightened sufficiently to eliminate excessive relative play during operation but not tightened so as to prevent rotation of the clip on the screw. A small amount of axial play may exist between the clips and the tie bar in the unattached condition. However, the resilient springs material of the clips arches to take up such play upon connection to a member.

Other objects and features of the invention will be apparent upon a perusal of the following description taken in conjunction with the accompanying drawings in which.

Figure 1:
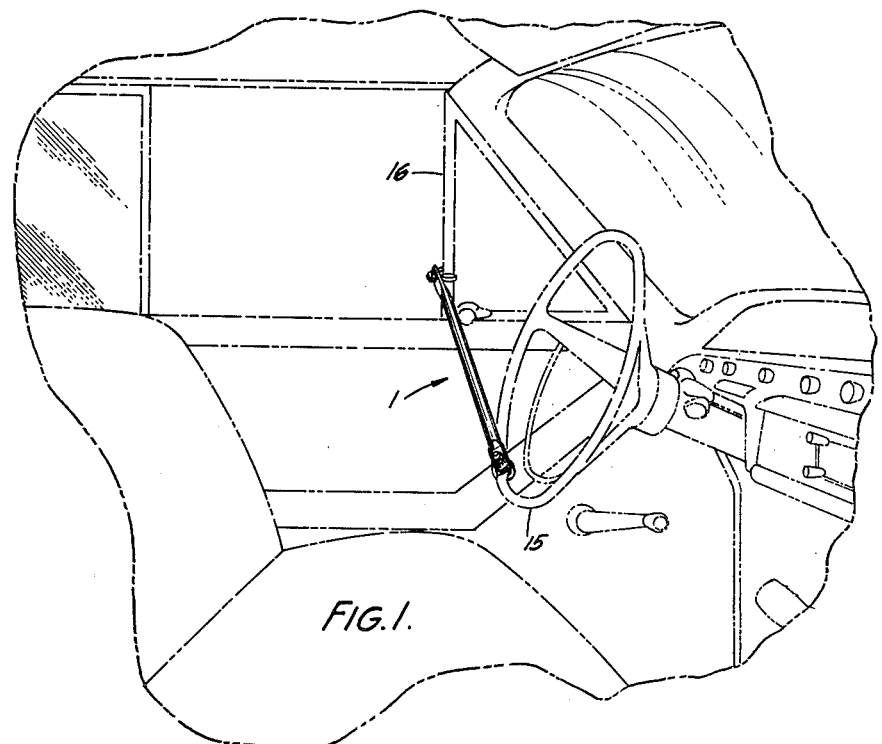
FIG. 1 is a perspective view illustrating the anchoring of a steering wheel by the improved clamp.
Figure 2:
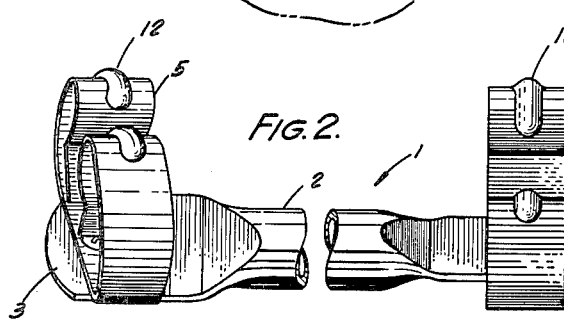
FIG. 2 is a perspective view of the improved clamping device.
Figure 4:
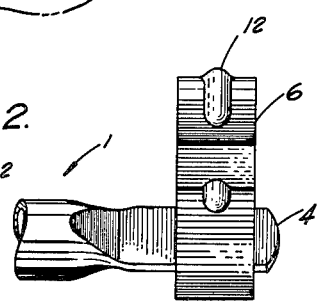
FIGS. 3 and 4 are end views of the preferred spring clip in its attached and unattached conditions.
Figure 3:
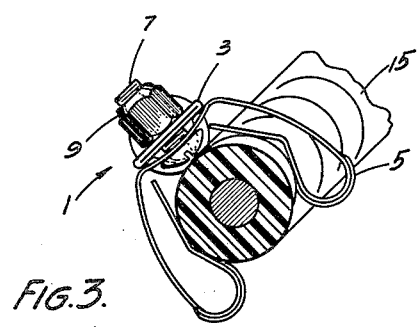

The improved clamp assembly 1 comprises a generally cylindrical tie bar 2, the ends of which are flattened at 3 and 4. The flattened ends 3 and 4 lie in planes which are preferably at an angle in the order of 45° from each other. The assembly 1 includes a pair of spring clips 5 and 6. Clips 5 and 6 are secured to the ends 3 and 4 by means of machine screws 7 and 8 and elastic stop nuts 9 and 10. The stop nuts are preferably threaded on the screws so as to leave small gaps such as 11. These gaps may be in the order .005 of an inch. The clips are provided with stiffening ribs 12.

As best seen in FIG. 1, the assembly 1 is connected at one end to a steering wheel 15 and at its other end to the vent window post 16 of a vehicle door. Even though the bar 2 is of fixed length, the clamp assembly 1 is adapted for use with all known domestic and foreign vehicles. This is made possible in the preferred embodiment by forming the flat ends of the bar 2 at a sharp angle relative to each other, for example 45°, and by rotatably mounting the spring clips on the flat ends. This provides a wide range of relative angular positions for the clips, whereby one or more elements available in each vehicle may be selected for anchoring the steering wheel. The only requirements are (1) that one portion of an edge of the element be spaced from an upper or lower portion of the steering wheel a distance equal to the spacing between the clips, and (2) that the angle between the element edge portion and the selected steering wheel portion are within the broad range of relative angles available to the clips.

These requirements are minimized since large arcuate upper and lower portions of the steering wheel may be used. In a few instances, even the central horizontal portions may be used. The only limitation is the requirement that the forces tending to turn the wheel be directed by the wheel generally in the longitudinal or axial direction of the bar, since the bar and clips supported by the selected anchoring element offer a strong resistance to such axial forces but only low resistance to transverse forces. High transverse forces will disengage one of the clips from the member to which it is attached.

Since the steering wheel clamp assembly is ideally suited for axial loading conditions, the bar 2 should be approximately tangent to the portion of the steering wheel periphery to which a clip is attached. It has been found that there are only small variations in the spacing between the adjacent portion of the steering wheel periphery and the window of the left hand door. Consequently, it has been possible to select a bar providing a spring clip axis spacing approximating a typical distance, e.g. 15″, between the axis of the steering wheel and the adjacent door which permits simplicity of clamping the wheel by means of the window or vent post in most applications.

While there has been described what is at present believed to be the preferred embodiment of the invention, it will be understood that various changes and modifications may be made therein; and it is contemplated to cover in the appended claims all such changes and modifications as fall within the true spirit and scope of the invention.

What is claimed is:

1. A readily removable steering wheel clamp assembly for holding a steering wheel in any of its operative positions, the combination comprising an elongated rod of fixed length having a pair of substantially flat spaced surfaces angularly displaced from each other about the axis of elongation at a relatively sharp angle, a resilient spring clip for each surface, and a screw and elastic stop nut rotatably mounting each clamp element on its respective surface on an axis generally normal to the surface with a small amount of end play between each spring clip and its surface when the spring is in its relaxed condition, the spring clip arching in its clamped condition to take up the end play and substantially prevent rotation thereof about the axis.

2. A readily removable steering wheel clamp assembly for holding a steering wheel in any of its operative positions, the combination comprising an elongated rod of fixed length having a pair of substantially flat spaced surfaces angularly displaced from each other about the axis of elongation at an angle of approximately 45°, a resilient spring clip for each surface having an outer generally C-shaped portion and an inner bisected generally diamond-shaped portion forming extensions of the free ends of the outer portion, a pair of screws each received through apertures in the base of one of the C-shaped portions and in the rod at the corresponding surface rotatably mounting each spring clip on its surface on an axis generally normal to the surface, and a pair of elastic stop nuts for the screws securing the spring clips to the rods with a small end play only in the relaxed condition of the spring clips, the spring clips arching in the clamped condition to take up the end play and substantially prevent rotation thereof about the respective axis, whereby the spring clips are readily biased respectively, onto the steering wheel and any suitable member nearby fixed relative to the steering wheel to hold the steering wheel in any of its operative positions.

3. For use in a vehicle having a steering wheel, a readily removable assembly operable to hold the steering wheel in any of its operative positions, comprising in combination, an elongated tubular member of rigid construction along its length, said member having its opposite ends flattened out to define spaced surfaces rotated from one another with respect to the longitudinal axis of said member, and separate C-shaped spring clips mounted on the spaced surfaces to rotate about axes spaced a fixed distance apart each extending substantially normal to its respective surface, said clips being securable onto substantially any portion respectively, of the steering wheel and of the vehicle fixed relative to the steering wheel within said fixed distance and operable for securing the wheel against rotation.

References Cited in the file of this patent

UNITED STATES PATENTS

| | | |
|---|---|---|
| 228,816 | Huff | June 15, 1880 |
| 1,443,169 | Conrad | Jan. 23, 1923 |
| 1,529,595 | Johnson | Mar. 10, 1925 |
| 1,569,986 | Kurtzeborn | Jan. 19, 1926 |
| 1,711,730 | Gibson | May 7, 1929 |
| 1,906,874 | Platt | May 2, 1933 |
| 2,146,190 | Luke | Feb. 7, 1939 |
| 2,256,107 | Zadek | Sept. 16, 1941 |
| 2,625,837 | Holmes | Jan. 20, 1953 |
| 2,707,052 | Brown | Apr. 26, 1955 |

FOREIGN PATENTS

| | | |
|---|---|---|
| 109,050 | Australia | Nov. 8, 1939 |
| 330,475 | Great Britain | June 12, 1930 |